Sept. 9, 1947.  W. H. NEWELL  2,427,154
SYNCHRONIZING CONTROL FOR MOTION REPRODUCING DEVICES
Filed July 15, 1942  2 Sheets—Sheet 2

INVENTOR
WILLIAM H. NEWELL
BY
ATTORNEY

Patented Sept. 9, 1947

2,427,154

UNITED STATES PATENT OFFICE 2,427,154

SYNCHRONIZING CONTROL FOR MOTION REPRODUCING DEVICES

William H. Newell, New York, N. Y., assignor to Ford Instrument Company, Inc., Long Island City, N. Y., a corporation of New York Application July 15, 1942, Serial No. 451,070

19 Claims. (Cl. 60—53)

The invention herein described may be manufactured by or for, may be used, and material embodying the invention may be sold or otherwise disposed of in accordance with law, by or for the Government of the United States of America, for governmental purposes, without the payment of any royalties thereon or thereunder.

This invention relates to automatic follow-up mechanisms for controlling the velocity and movement of a driven object in accordance with the movement of a primary movable object, and particularly to mechanisms of this character in which a prime mover such as a servo motor energized through means governed by a relay control member supplies power to the driven object.

The relay control member in such mechanisms is differentially controlled by the primary movable object and by the response from the prime mover so that the prime mover moves only enough to reproduce the movement of the primary movable object.

To be satisfactory the following in such mechanisms must be smooth and accurate, and the problem to which this invention is particularly directed is to cause the follower to attain synchronism with the primary object quickly and without overrun from a condition of considerable departure from agreement. The difficulty in this respect is related to the mass of the movable object and increases as the mass increases.

It will be considered for the purpose of this disclosure, therefore, but without limitation, that the driven object is a heavy ordnance piece, such as a gun, and that the gun is following an incoming signal, such as the movement of a director sight, which movement is transmitted through an electrical self synchronous transmission system. As an illustration of a situation in which the synchronizing means of this invention is serviceable, control means are shown for taking the gun actuation away from the follow-up mechanism and causing it to move to a definite position, such as a loading position. When the control is thrown back on the follow-up it is essential that the gun come promptly into synchronism with the signal. To effect this result the invention contemplates a supplemental power actuated response device that is responsive to the departure of the follower from the signal and puts into the response just what it otherwise lacks to regulate the control of the prime mover. Preferably the supplemental response device will not be activated until the departure from synchronism is of a predetermined value which will serve to hold the control member for the prime mover on the corrective side for the given condition.

Practically the primary movement or data to be followed may be transmitted to fine and coarse receivers in the well known way and the coarse receiver may govern the control for the supplemental response device to add to the response when the departure is increasing and to remove what it has added as the departure decreases.

To accomplish this the supplemental response device has two controls, one governed by the coarse receiver when the departure or error is increasing, at which time the supplemental response device is adding to the response of the servo motor and is storing up energy in the second control in proportion to a function of the error. The energy stored in the second control is utilized to return the supplemental response device to its central or zero position and thereby to extract from the response the added amount at a controlled speed proportional to a function of the error. As the error decreases, therefore, the speed of the supplemental response device decreases until the proper relative speeds of the two components of response are attained to cause the gun to come smoothly into synchronism with the signal. If it is necessary for the gun to reverse its direction of movement in order to come into synchronism with the signal, the rate of response from the prime mover will come to exceed that from the supplemental response device when the magnitude of the error is sufficiently diminished, and the prime mover will be caused first to decelerate and then to reverse and accelerate to the speed of the signal. The control mechanism is so designed that the relative speed of the gun and signal during the synchronizing period bears a definite relation to the error or distance that the two are out of agreement, and therefore as the gun is approaching the signal it will start to decelerate at just the right distance from the signal, depending upon the relative speed to come into synchronism in a minimum time. This distance can be computed from the equation for accelerated motion.

The invention also comprehends various details in the features of control which will hereinafter more fully appear.

The invention will now be described with the aid of the accompanying drawings after which the invention will be pointed out in claims.

It has been chosen to illustrate the invention in an electrically energized system, but it will be understood that hydraulic or other form of control mechanism is equally within the contemplation of the invention.

For the purpose of illustration the control for normally following the signal will be shown in a simple form devoid of anti-hunting features, but there are many uses in which it will be necessary to incorporate anti-hunting features such as speed or acceleration correction elements to modify the action of the control mechanism. Since these anti-hunting features form no part of the present invention they have not been shown.

Figure 1:
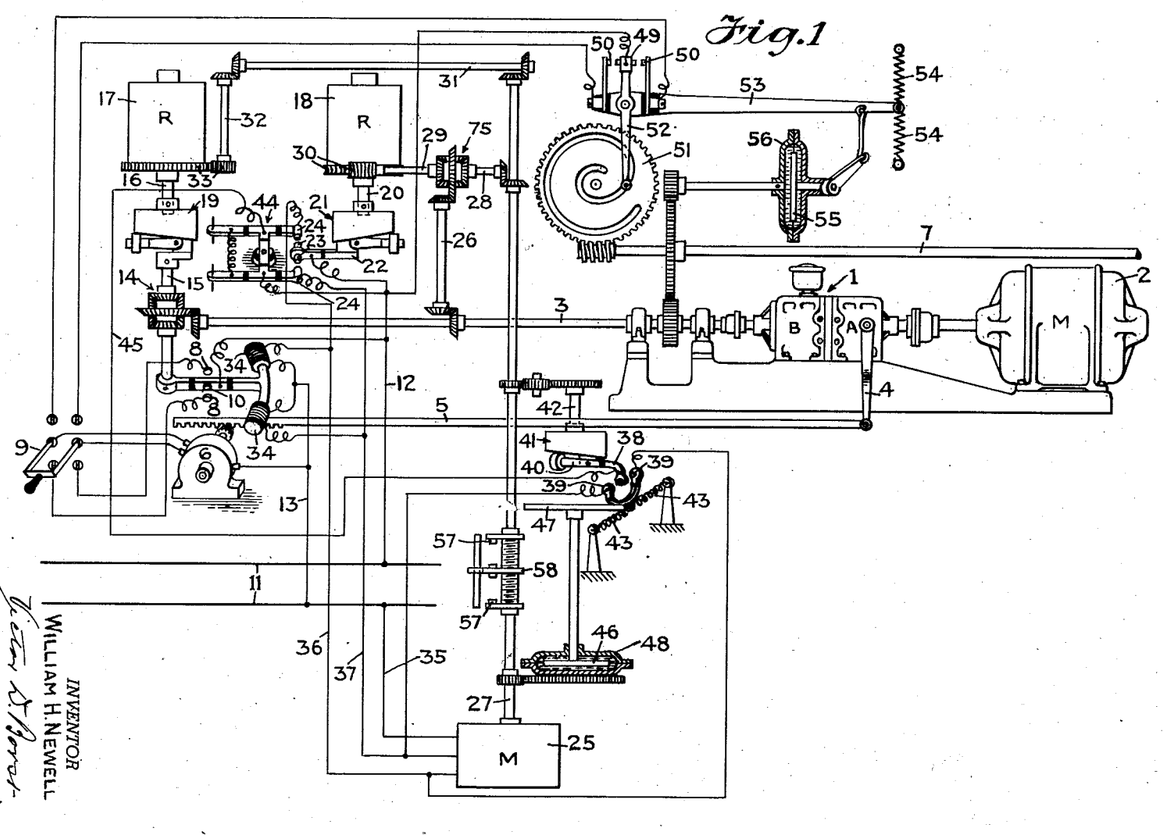
Fig. 1 is a diagram of a complete system embodying the invention.

In its fundamental elements the system is a conventional servo motor and relay control follow-up mechanism, the power or servo motor I being a hydraulic variable speed gear of well known form which includes a hydraulic pump known as the "A" end driven by an electric motor 2, and a hydraulic motor known as the "B" end and connected to a shaft 3 which may be termed the response shaft. The pump is rotated at constant speed and the speed of the motor or "B" end is determined by the position of a tilting box or swash plate actuated by a crank arm 4 that is operatively connected to a rack arm 5. The position of the rack therefore determines the direction and speed of the hydraulic motor. In the form shown a reversible electric motor 6 positions the rack through a pinion on the armature shaft. The output or load shaft 7 which is the follower shaft or the one that operates the elevating gear for the gun, is geared to the response shaft 3.

The control for the motor 6 is a pair of fixed electric contacts 8 electrically connectable to the reverse field windings of the motor through a double throw two pole switch 9, and a cooperative movable double contact 10 electrically connected to one side of a power line 11 through lead 12. The field windings of the motor are connected through a common lead 13 to the other side of the power line. Therefore when the switch 9 is down the motor circuit is controlled through one or the other of the contacts 8 depending upon the bias of the movable contact 10.

This movable contact is connected to the output side of a differential gear 14 which compares the signal with the response or movement of shaft 3, which as shown is connected by bevel gears to the spider or center of the differential. The third side is connected to shaft 15 that is connected to the shaft 16 of the rotor of receiver 17 of an electric synchronous transmission system.

The signal values are also received by receiver 18 which is geared to rotate in a ratio of 1 to 1 to the signal, the receiver 17 being geared to a higher ratio, say 36 to 1. In other words the receiver 17 is the fine receiver and the receiver 18 is the coarse receiver.

The differential input shaft 15 is connected to the receiver rotor shaft 16 through a yieldable drive coupling 19 of the construction shown in the patent to Poitras and Tear No. 2,134,488. Similarly the rotor shaft 20 of coarse receiver 18 is connected through yieldable drive coupling 21 to the movable arm 22 that carries the central contacts 23 which coact with relatively fixed reversing contacts 24. These contacts control an auxiliary motor 25 that constitutes the supplemental response device above referred to.

The receivers 17 and 18 are shown as the type in which the stator is rotatable and the feedback from the follower may be used to turn the stator against the direction of rotation of the magnetic field, so that the receiver acts as a differential and the output of the receiver is a comparison of the signal and response. The response fed back to the stator of the coarse receiver 18 is the combined response of the power and auxiliary motors, while the response fed back to the stator of the fine receiver 17 is only that of the auxiliary motor.

The receivers 17 and 18 may be of the fixed stator type in which case the differential effect of the response is obtained by inserting a differential between each rotor shaft and its coupling. Instead of connecting the response from the motors to rotate the stators as shown, the response connections, shafts 32 and 29, would in such case be made to the third member of the respective differentials. The resulting movements of shaft 15 and arm 22 would be the same as in the construction shown.

The response of the power and auxiliary motors is combined by differential 75. In the connection shown the response shaft 3 feeds into the center of the differential through shaft 26 and connecting gearing, and the output shaft 27 of motor 25 feeds into one side of the differential through shaft 28 and connecting gearing. The third side of the differential is connected to the shaft 29 that drives the stator or receiver 18 through the worm and worm gear 30. The movement of shaft 27 is also fed to the stator of receiver 17 through shafts 31 and 32 and their connecting gearing, and the gears 33.

If the receiver 17 be of the fixed stator type, then instead of the differential above suggested between the shaft 16 and the coupling 19, the shafts 31 and 32 may be eliminated and shaft 29 instead of shaft 3 be connected to differential 14. The action of contact 10 will of course be the same as in the construction shown.

With the ratios mentioned a complete rotation of the fine receiver rotor represents 10° of signal movement. Therefore the spring pressed roller of the yieldable drive 19 will ride from its biased position on the low point of the cam to the high point in 5° difference of signal movement and response. On further difference of movement the roller will snap over the high point and return down the other side of the cam to the low point and thereby introduce another 5° of error in the output. Before this high point is reached, however, the coarse receiver closes its contacts and takes control. The spacing of each coacting pair of the contacts 23 and 24 is thus made less than 5° of signal movement. Let us assume for the purpose of this description that the spacing of the coarse receiver contacts is 2½°. When response of shaft 3 is 2½° behind the incoming signal, contacts 23, 24 will close one way or the other depending on which way the signal is coming in. The cam roller of yieldable drive 19 will have ridden about half way up the cam, or in other words the roller arm will have moved about one quarter of a complete rotation. This biases the contacts 10 of the control motor 6 to closed position one way or the other.

Means are provided to cause the coarse receiver to take control of the contacts 10 as soon as the coarse contacts are closed, and thus prevent the roller of yieldable drive 19 from snapping over and introducing additional error when the error reaches 5°. In the form shown this safeguard is provided by solenoids 34 which bias the arm of contacts 10 one way or the other depending upon which one is energized. These solenoids are connected to one side of the power line 11 through the common lead 13, and the other ends of the windings are connected to the respective contacts 24, the center contacts 23 being connected to the other side of the line through lead 12.

The solenoids 34 are connected to the power line 11 in parallel with the auxiliary motor 25. The windings of the motor are connected to one side of the line by common lead 35, and the windings are respectively connected to contacts 24 through leads 36 and 37 which connect with the leads of the solenoids 34. The closing of the coarse receiver contacts therefore serves to energize the motor 25 and cause rotation of the shaft 27 and at the same time energize one of the solenoids 34.

The motor 25 is normally biased to a central or zero position under the control of a second set of contacts the circuit for which includes a circuit breaker that is biased to closed position but is opened by the closing of either of the coarse receiver contacts. The contacts of this second set also function as the energy storing device which has energy stored in it by the motor 25 when operating under the control of the coarse receiver contacts, and which expends that energy when the coarse receiver contacts are opened and the circuit breaker is closed to cause the motor to run in the opposite direction, that is, toward its zero position and at a speed that is proportional to the energy. The energy in turn is a function of the amount that the motor 25 has run from its central or zero position under the control of the coarse receiver contacts, and hence the speed of counter movement of the auxiliary motor is a function of the error. In other words the speed of removal of the error through operation of the motor 25 at any instant is a function of the amount of error at that instant.

The second set of contacts for the motor 25 consists of a movable pair of central contacts 38 and a coacting pair of yielding reversing contacts 39. As shown in Fig. 1 the movable contacts 38 are on the roller arm 40 of yieldable drive 41 the cam member of which is on shaft 42 geared to shaft 27.

The yieldable reversing contacts 39 are connected respectively to leads 36 and 37 and the direction of drive of arm 40 is such that the proper contact 39 is engaged to cause the motor 25 to reverse its direction when the circuit breaker is closed as the coarse receiver contacts are opened. The contacts 39 are biased by centralizing springs 43 and a departure from the central biased position stores up energy in the springs an amount proportional to the displacement.

The circuit breaker in this control circuit to motor 25 is indicated generally by the reference character 44. It consists of a fixed central conductive bridging element and two pivoted arms that carry the contacts 24 and have insulated portions cooperative with the bridging element to close a circuit to the central contact 38 through leads 12 and 45. A coil spring biases the arms to circuit closing position but allows the arms to rotate on their pivots and break the circuit between leads 12 and 45 when one of contacts 23 engages one of contacts 24.

For reasons which will appear the maximum speed of the motor 25 must at least be equal to that of the power motor, and it is necessary that the speed be controlled when the motor is energized by the circuit including contacts 38, 39. To effect such control a limit is put upon the rate at which the contacts 39 can return to biased or centralized position. The rate of this return is retarded by braking means which in the construction shown is in the form of a viscous drag. A drag disc 46 which is attached to an arm 47 coupled at one end to the inner ends of springs 43, is disposed in a chamber 48 filled with a liquid such as oil. The contacts 39 are mounted on arm 47. The drag effect is augmented by the fact that the chamber 48 is geared to the shaft 27 so as to be turned against the rotation of the disc 46 as the disc is rotated under the influence of one of the springs 43.

The viscous drag determines the speed at which the yieldable contacts 39 can return to central position, and thus the speed of motor 25 is determined, for as soon as the speed of the motor is sufficient to move the central contact 38 away from the contact 39 the motor circuit is open and the speed reduces until the contact 39 again engages the contact 38. The more energy that is stored in the spring the faster will the contact 39 move against the resistance of the drag. Therefore it will be seen that the speed of the motor 25 in the counter direction is proportional to the stored energy which is a function of the error, that is, of the amount that the motor 25 turned from its central position when the contacts 23, 24 were closed.

The operation of the mechanism so far described will now be explained. A signal is coming in to the receivers 17 and 18 and rotates the receiver rotors at the speed ratios of 36 to 1. The rotation of the shaft 16 is fed into the differential 14 through shaft 15. Initially before the power motor started to follow and got up to speed the input of the shaft 15 exceeded that of the shaft 3 with the result that contact 10 engages contact 8 on one side or the other, depending on the direction of the signal, and the circuit of motor 6 is closed, switch 9 being assumed to be down in closed position. Motor 6 shifts rack 5 and moves the tilting box of the "A" end of the hydraulic gear to a speed position which will cause the "B" end to run and catch up with the signal and open the contacts 8, 10, thus establishing a response speed and position equal to the rotor speed and angular position. At the same time the response is fed into differential 75 and the stator of the coarse receiver is turned backward so as to neutralize the incoming signal and keep the rotor stationary.

Now assume that for some reason the response starts to lag and the gun falls behind the signal more than the 2½° that represents the spacing of the coarse receiver contacts. As soon as the contacts 23, 24 close the motor 25 starts to run from its central position and put into the differential 75 through shafts 27 and 28 the amount that the response is lagging. The shaft 29 and hence the stator of receiver 18 are thus kept in position where the signal is satisfied except for the 2½° necessary to close the contacts 23, 24. The shaft 29 may therefore be considered the pseudo response, which is what the response would be if there were no lag except the 2½°.

At the same time the correction value put in by the shaft 27 is applied through shafts 31, 32 and gears 33 to the stator of receiver 17 so that that much of the signal which exceeds the response of motor 1, except for the 2½°, is neutralized. This feed-back to the fine receiver stator of the output of motor 25 avoids the manifesting of the error in the yieldable drive 19 beyond the 2½° which is required to energize the motor 25.

That 2½°, however, causes solenoid 34 to be energized by contacts 23 and 24 and keeps the control of contacts 8, 10 with the coarse receiver. The amount that the error exceeds 2½° is made up by motor 25 so that the position of pseudo response shaft 29 will represent the signal less the angular movement necessary to close contacts 23, 24, here for illustration taken to be 2½°. In other words the rotor of receiver 18 will be only called upon to turn 2½°. Also since the output of motor 25 is fed back to the stator of receiver 17, the rotor of receiver 17 will turn only as much as the response shaft 3, in other words enough to match the response of the servomotor. The additional 2½° that the signal is out of agreement with the gun is absorbed in the yieldable drive 19.

This is the condition so long as the error is increasing. Once the gun starts to approach the signal the motor 25 has to back out the amount added by it at a rate to keep the shaft 29 in agreement with the signal minus the 2½°. Once the discrepancy between the shaft 29 and the signal falls within the 2½° limit necessary to maintain the contacts 23, 24 closed, these contacts open. The alternate circuit for motor 25 thereupon is closed by the circuit breaker, the contacts 38, 39 being now closed and the position where the contacts are satisfied being now displaced and energy being stored in the springs an amount representing a function of the amount that the shaft 27 was turned to compensate for the error. The motor 25 is now caused to turn in the opposite direction at a rate the maximum of which is controlled by the rate of return of the contact 39 to central position. The rate will progressively decrease as the error diminishes and the energy stored in the springs 43 is expended, until the speed of response from the servo motor comes to equal and then to exceed that from the auxiliary motor, whereupon the shaft 29 catches up with and then exceeds the signal. At that point the contact 10 is reversed for the two components of response exceed the signal. This reversal energizes the motor 6 in the opposite direction and the rack 5, which controls the speed and direction of the servomotor, is actuated so as to slow down the servomotor and, if occasion demands, to reverse it so as to bring it smoothly into synchronism with the signal. The point at which the deceleration of the servomotor starts is a function of the relative speeds of the signal and gun and of the controlled acceleration of the servomotor.

An example of the need of this synchronizing control is where a gun that is automatically kept in synchronism with a signal is moved to load position, as shown for instance in the pending application of Poitras and Tear, Serial No. 15,758. When the control is thrown back on automatic, the gun may have to move several degrees in elevation to come back into synchronism with the sight, and accuracy and speed are desirable.

In Fig. 1 is shown means for bringing the gun to load position when the switch 9 is thrown to connect the motor 6 with the upper contacts. The motor circuit then includes the set of contacts including the central movable double contact 49 that is connected to the power line 11 through lead 12, and cooperative reversing contacts 50 that are electrically connected to the two upper contacts of switch 9. Thus when the switch 9 is up and one pair of contacts 49, 50 is closed, the motor 6 will be energized. The position of the central contacts 49 is controlled by a spiral cam 51 that is turned by the servomotor through a worm on the shaft 7 that meshes with a gear on the cam. The arm 52 for the central contacts 49 has a cam follower that rides in the cam groove of cam 51 and the parts are so designed that the arm 52 is centralized and the contacts 49, 50 are open when the gun is at loading position. A departure from that position rotates the cam and moves the arm 52 one way or the other so that one or the other of the contacts 50 is engaged by a contact 49 ready to energize the motor 6 when the switch 9 is thrown up and cause the motor to operate the tilting box to cause the hydraulic gear to bring the gun to loading position, at which position the contacts 49, 50 are again open. The gun will therefore remain in loading position indefinitely so long as the switch 9 is up. To bring the servomotor back into automatic control it is necessary to throw the switch 9 down to the lower contacts.

The rate at which the gun is brought to loading position is controlled by a friction drag arrangement similar to that associated with the contacts 39. The contacts 50 are made yieldable to absorb movement of the contacts 49 beyond that necessary to close the contact. For this purpose the contacts are mounted upon a pivotal arm 53 that is biased by centralizing springs 54. Normally the springs will hold the arm in position where the contacts are open when the gun is at loading position. This is the position shown in Fig. 1. When the hydraulic gear moves the gun from loading position, which it can only do when the switch 9 is down and hence the contacts 50 are on open circuit, the cam 51 is rotated and the arm 52 is rotated one way or the other so as to engage a contact 50 and rotate the arm 53 against the bias of the centralizing springs. The arm 53 is connected by linkage to a friction disc 55 that rotates in an oil chamber 56. This chamber is shown as geared to rotate with the shaft 7.

When the switch 9 is thrown up to bring the gun to loading position the arm 53 will therefore be out of biased position. Since the servomotor moves the central contacts 49 back toward central position as the gun is moved toward loading position, and since the contacts 50 are out of their biased position and therefore tend to follow up the central contact, it is apparent that the gun can move no faster than the return of the contacts 50 permits. The viscous drag imposes a definite limit upon this and the motor will therefore bring the gun smoothly and steadily to loading position. The drag effect is augmented by the counter movement of the chamber 56 through its gear connection with the shaft 7.

Since the function of the auxiliary motor 25 is primarily to control the synchronizing of the gun with the signal, that is, to assure its coming smoothly into synchronism from a position where the two are considerably out of agreement, and since the point in approach at which deceleration must begin is a function of the relative velocity of the gun and signal, it is manifest that there is a limit beyond which there is no advantage in having the auxiliary motor operate. Where there is an error to be introduced as great as that created by bringing the gun to loading position, it will therefore be permissible to stop the motor 25 when the discrepancy reaches a fixed amount and then let it come back into operation again when the error diminishes to the fixed amount. The only necessary precaution is that the value of the error at which the stops come in shall be enough to allow the synchronizing function to take place at the maximum relative velocity.

In the construction shown stops are provided for limiting the rotation of the armature of motor 25 in both directions. Stops 57 extending from arms secured on shaft 27 are disposed in the path of cooperating pins extending from nut 58 which is threaded on a screw threaded portion of the shaft 27. The nut 58 is held against rotation and is therefore fed up or down, depending on the direction of rotation. When the stop pin on the nut engages a stop on the arm further rotation of the shaft in that direction is prevented. The motor is of course free to rotate in the opposite direction which it will do when the contacts 38, 39 come into control, as above explained.

Figures 2, 4:
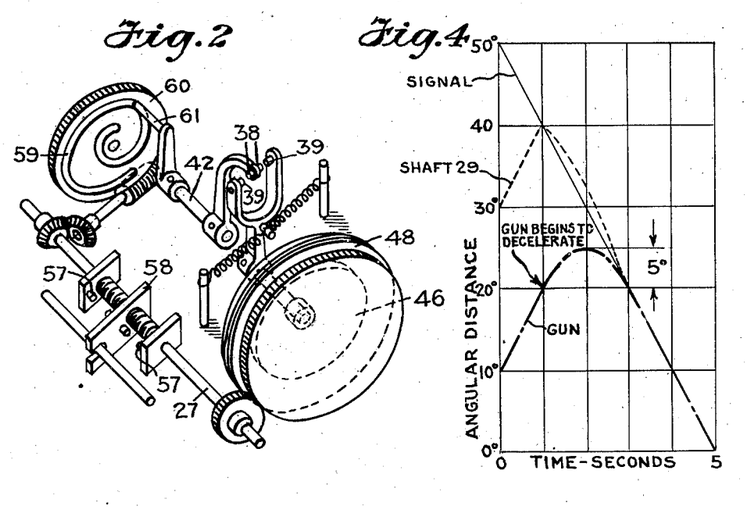
Fig. 2 is an isometric detail of a form of mechanism for storing up energy in the second control for the supplemental response device proportional to a function of the error.
Fig. 4 is an enlarged portion of the graph of Fig. 3 that immediately includes the synchronizing of the gun and signal, but with a higher velocity for the signal.
Figure 3:
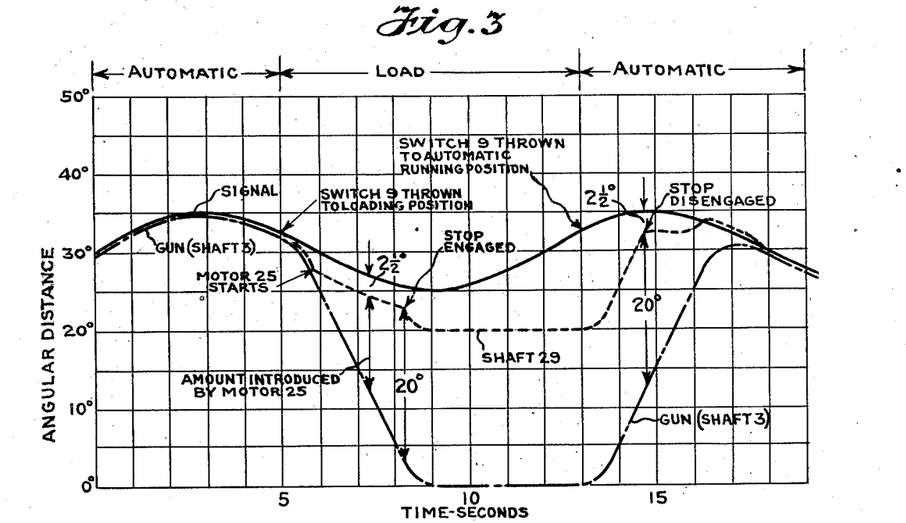
Fig. 3 is a graph showing the relative movements of the signal, gun and the pseudo response shaft plotted against angular distance and time as coordinates.

The operation is graphically shown in Figs. 3 and 4. If the bottom line represents the deck of a ship and the vertical coordinate the movement in elevation, then the signal is shown as rising and falling relative to the deck, to compensate for the roll of the ship. If the divisions of time be taken as seconds and the distance divisions be taken as degrees of angle, then for substantially the first five seconds the signal and gun are in synchronism while the ship rolls over and back through an angle of substantially 5°. At that point it is indicated that the switch 9 is thrown on to the loading position contacts. The motor 1 directly brings the gun to parallelism with the deck in about four seconds. The characteristics of the control of motor 6 are such that the gun comes to a stop through a proper deceleration curve.

The auxiliary motor 25 starts to run just as soon as the discrepancy between the gun and signal reaches 2½° when the contacts 23, 24 are closed, and it runs just fast enough to make up the discrepancy between the gun and signal less the 2½°. In other words it keeps the pseudo response shaft 29 in agreement with the signal except for the 2½°. The 2½° discrepancy between the signal and the angular position of shaft 29 is absorbed by the movement of contact 23 necessary to engage contact 24 and by movement of shaft 16 relative to shaft 15. This relative movement between shafts 16 and 15 is absorbed by coupling 19, the roller of which will be displaced up the cam surface an equivalent of 2½° of signal or 90° actual rotation between shafts 16 and 15. This condition will exist until the motor 25 has compensated for 20° of error in addition to the initial 2½° discrepancy necessary to close contacts 23 and 24. The stop for motor 25 is shown as engaged when this 20° has been reached. From that point on the compensation shaft 27 is stationary and the response shaft 3 alone controls the pseudo response shaft 29.

As soon as the motor 25 stops introducing into differential 75 and into the stator of receiver 17 a movement to compensate for the difference between the gun and signal positions, the shaft 29 is forced to follow the gun at the 20° displacement. The motor 1 continues to run on until contacts 49, 50 open and the arm 53 has returned to its central position under the action of springs 54 acting against the viscous drag 55. This action causes motor 6 to control the rack and tilting box so as gradually to slow down the power motor and bring it smoothly to a stop.

During all the time the switch 9 has been in the up or loading position the contacts 10 and 23 are biased in a position to cause motor 6 to move the rack to a position to cause motor 1 to run in a direction to synchronize with the signal as soon as switch 9 is thrown down.

In the graph the signal is shown as starting to increase just as the motor 1 has brought the gun to the loading or zero position. While the motor 1 is held stationary the difference between the now stationary response shaft 3 and the signal and the difference between the stationary pseudo response shaft 29 and the signal are both increasing. To allow for this increased difference the roller of coupling 21 will run up the cam an amount corresponding to the difference between the signal and the pseudo response shaft 29 less the 2½° necessary to close contacts 23 and 24. The roller of coupling 19 will run up and down the cam as necessary to allow for this same difference between shafts 16 and 15. If the bias of the roller of coupling 19 is reversed by the roller going over the high point of the cam, the bias of contact 10 will be reversed which will tend to make contact 10 reverse. This reversal is prevented by the energization of one of the solenoids 34 under the action of contacts 23 and 24, since the movable contact 23 is continuously biased in one direction by the coupling 21.

When the loading is done the switch 9 is thrown back to automatic. In the graph substantially four seconds are allowed for loading. Meanwhile considerable error has developed which is absorbed in the couplings 19 and 21. Contacts 8, 10 will therefore remain closed until the response comes to approach the signal. The motor 6 will have moved the tilting box to its maximum speed adjustment and the gun will approach the signal at full speed. As soon as the response of shaft 3 reaches the value of error at which the auxiliary motor was stopped out, the contacts 23, 24 are opened, the circuit breaker 44 is closed, and the motor 25 comes under the charge of contacts 38, 39 and starts running in the reverse direction to take out the discrepancy between the shaft 29 and the gun response shaft 3. The controlled speed of motor 25 will exceed that of the response from motor 1 while the error is large since the stored energy in springs 43 is then large, and the motor 25 will therefore control the position of contact 10. As the energy runs out and the auxiliary motor slows down, the power motor speed will be reduced for the reason that the contact 10 will reverse and the motor 6 will be actuated to adjust the tilting box to cause a lower speed of motor 1.

Under the conditions of the graph of Fig. 3 the gun must not only decelerate to come into synchronism but must reverse. Nothing happens to motor 6 until the pseudo response shaft 29 catches up with the signal and the response actually gets ahead of the signal. This is indicated in the graph at the point where the line representing shaft 29 crosses the signal line. Thereupon contact 10 is reversed and the motor 6 is energized to adjust the rack 5 and the tilting box to decelerate the motor 1. Since the signal is decreasing the gun is obliged to reverse. Therefore the motor 6 moves the tilting box over to reverse and the gun is brought into synchronism with the signal without any overrun. Meanwhile the shaft 29 again assumes agreement with the signal, as indicated.

An extreme condition is represented in Fig. 4 in that the gun and signal are shown as approaching at full speed. The problem is to determine the distance between the gun and signal when the gun must begin to decelerate.

Let us assume a maximum velocity of both the gun and signal of 10° per second, and an acceleration of 10° per second per second. Then in one second the gun will decelerate from maximum to zero and will again accelerate from zero to maximum in one second. We get the distance that the gun moves during the acceleration from the equation $$S = \tfrac{1}{2} a t^2 \qquad (1)$$

Since $a$ is 10 and $t$ is 1, S is equal to 5. In two seconds the gun is reversed and the signal in that two seconds will have moved 20°. The distance between the signal and gun, therefore, under the conditions given when the gun must begin to decelerate is 20°. At any instant the product of the distance and twice the maximum acceleration must equal the square of the instant relative velocity. In other words $$v^2 = 2aD \qquad (2)$$

where $v$ equals the instantaneous relative velocity, $a$ equals the maximum acceleration, and $D$ equals the instantaneous distance between the gun and signal. The motors and their controls will be designed to function accordingly.

With the mechanism shown in Fig. 1 the energy stored in the springs 43 is directly proportional to the error for which the motor 25 has compensated while governed by contacts 23, 24. It is manifest that the energy may bear some other function to the error and in Fig. 2 is shown a construction for making the displacement of the yieldable contacts a selected function of the error, for example, Equation 2 above.

In the form shown in Fig. 1 the shaft 42 is geared to be driven in a definite ratio to shaft 27. In the construction of Fig. 2 the function is determined by a cam groove 59 formed in the face of a disc 60 that is geared to the shaft 27 to be rotated upon its central axis. A cam follower 61 which engages in the cam groove actuates a crank on the end of shaft 42 and thereby determines the angular position of the shaft. The cam groove is designed to give the proper function.

The embodiments of the invention shown in the drawings and above particularly described are intended to be merely illustrative and not limiting. Various other ways to embody the invention without departing from the scope of the appended claims will occur to those skilled in the art. As an equivalent of the electrical transmission system shown it is contemplated that the transmission of data may be accomplished by mechanical connections terminating in coarse and fine controlling members geared at the desired ratios such as that of the coarse and fine receivers, and the terms coarse and fine receivers are intended to comprehend such construction.

I claim:

1. Motion reproducing mechanism comprising coarse and fine receivers of a transmission system, a driven member, a reversible servomotor operatively connected to the driven member, a control member for the servomotor, a differential the output of which is operatively connected to the control member, means connecting the outputs of the fine receiver and of the servomotor to position the two input elements of the differential, an auxiliary motor and a control member therefor controlled by the coarse receiver, and means actuated by the output of the auxiliary motor to modify the position of one of the input elements of the differential in a direction to compensate for the difference between the outputs of the fine receiver and of the servomotor.

2. Motion reproducing mechanism comprising coarse and fine receivers of a transmission system, a driven member, a reversible servomotor operatively connected to the driven member, a control member for the servomotor, a differential the output of which is operatively connected to the control member, means connecting the outputs of the fine receiver and of the servomotor to position the two input elements of the differential, an auxiliary motor, means for combining the outputs of the auxiliary and servomotors, means actuated by the combining means to modify the position of the output of the coarse receiver, a first control member for the auxiliary motor controlled by the modified output of the coarse receiver, a second control member for the auxiliary motor arranged to be displaced from a central biased position by movement of the auxiliary motor when the auxiliary motor is actuated by the first control member, said second control member being arranged to actuate the auxiliary motor to return the second control member to its central position when the auxiliary motor is energized thereby, and means actuated by the output of the auxiliary motor to modify the position of one of the input elements of the differential in a direction to compensate for the difference between the outputs of the fine receiver and of the servomotor due to movement of the auxiliary motor.

3. Motion reproducing mechanism comprising coarse and fine receivers of a transmission system, a driven member, a reversible servomotor operatively connected to the driven member, a control member for the servomotor, a differential the output of which is operatively connected to the control member, means connecting the outputs of the fine receiver and of the servomotor to position the two input elements of the differential, an auxiliary motor, means for combining the outputs of the auxiliary and servomotors, means actuated by the combining means to modify the position of the output of the coarse receiver, a first control member for the auxiliary motor controlled by the modified output of the coarse receiver, a second control member for the auxiliary motor arranged to be displaced from a central biased position by movement of the auxiliary motor when the auxiliary motor is actuated by the first control member, said second control member being arranged to actuate the auxiliary motor to return the second control member to its central position when the auxiliary motor is energized thereby, disabling means for the second control member controlled by the first control member, and means actuated by the output of the auxiliary motor to modify the position of one of the input elements of the differential in a direction to compensate for the difference between the outputs of the fine receiver and of the servomotor due to movement of the auxiliary motor.

4. Motion reproducing mechanism comprising coarse and fine receivers of a transmission system, a driven member, a reversible servomotor operatively connected to the driven member, an electric circuit for controlling the servomotor including two fixed reversing contacts and a cooperative movable contact, a differential the output of which is connected to the movable contact, means connecting the outputs of the fine receiver and of the servomotor to position the two input elements of the differential, an auxiliary motor and an electric circuit therefor controlled by the coarse receiver, and means actuated by the output of the auxiliary motor to modify the position of one of the input elements of the differential in a direction to compensate the electric circuit for controlling the servomotor for the difference between the outputs of the fine receiver and of the servomotor.

5. Motion reproducing mechanism comprising coarse and fine receivers of a transmission system, a driven member, a reversible servomotor operatively connected to the driven member, an electric circuit for controlling the servomotor including two fixed reversing contacts and a cooperative movable contact, a differential the output of which is connected to the movable contact, means connecting the outputs of the fine receiver and of the servomotor to position the two input elements of the differential, an auxiliary motor and an electric circuit therefor including two pairs of reversing contacts, means for differentially combining the outputs of the auxiliary and servomotors, means actuated by the output of the combining means for modifying the output of the coarse receiver, one pair of said reversing contacts in the electric circuit for the auxiliary motor being controlled by the modified output of the coarse receiver and operative to energize the auxiliary motor in a direction to add to the movement of the servomotor, the second pair of reversing contacts in the electric circuit for the auxiliary motor arranged to be displaced from a central biased position by movement of the auxiliary motor when the motor is energized by the first contacts, said displacement of the second pair of reversing contacts being in a direction to energize the auxiliary motor in a direction to subtract from the movement of the servomotor, and a circuit breaker for the second pair of contacts controlled by the first pair.

6. Motion reproducing mechanism comprising coarse and fine receivers of a transmission system, a driven member, a reversible servomotor operatively connected to the driven member, an electric circuit for controlling the servomotor including two fixed reversing contacts and a cooperative movable contact, a differential the output of which is connected to the movable contact, means connecting the outputs of the fine receiver and of the servomotor to position the two input elements of the differential, an auxiliary motor and an electric circuit therefor including two pairs of reversing contacts, means for differentially combining the outputs of the auxiliary and servomotors, means actuated by the output of the combining means for modifying the output of the coarse receiver, one pair of said reversing contacts in the electric circuit for the auxiliary motor being controlled by the modified output of the coarse receiver and operative to energize the auxiliary motor in a direction to add to the movement of the servomotor, the second pair of reversing contacts in the electric circuit for the auxiliary motor being arranged to be displaced from a central biased position by movement of the auxiliary motor when the motor is energized by the first contacts, said displacement of the second contacts being operative to energize the motor in a direction to subtract from the movement of the servomotor, a circuit breaker for the second pair of contacts controlled by the first pair, and means controlling the speed of the auxiliary motor when energized through the second pair of contacts.

7. Motion reproducing mechanism comprising coarse and fine receivers of a transmission system, a driven member, a reversible servomotor operatively connected to the driven member, an electric circuit for the servomotor including two fixed reversing contacts and a cooperative movable contact, a differential the output of which is connected to the movable contact, means connecting the outputs of the fine receiver and of the servomotor to position the two input elements of the differential, an auxiliary motor and an electric circuit therefor including two pairs of reversing contacts, means for differentially combining the outputs of the auxiliary and servomotors, means actuated by the output of the combining means for modifying the output of the coarse receiver, one pair of the said reversing contacts in the electric circuit for the auxiliary motor being controlled by the modified output of the coarse receiver and being operative to energize the auxiliary motor in a direction to add to the movement of the servomotor, the second pair of reversing contacts in the electric circuit for the auxiliary motor being connected in parallel with the first pair and including a movable contact element arranged to be actuated by the auxiliary motor and resiliently mounted cooperative contact elements adapted to yield but biased to central position, and a circuit breaker for the second pair of contacts controlled by the first pair, the second pair being connected to energize the auxiliary motor in a direction to subtract from the movement of the servomotor.

8. Motion reproducing mechanism comprising coarse and fine receivers of a transmission system, a driven member, a reversible servomotor operatively connected to the driven member, an electric circuit for the servomotor including two fixed reversing contacts and a cooperative movable contact, a differential the output of which is connected to the movable contact, means connecting the outputs of the fine receiver and of the servomotor to position the two input elements of the differential, an auxiliary motor and an electric circuit therefor including two pairs of reversing contacts, means for differentially combining the output of the auxiliary and servomotors, means actuated by the output of the combining means for modifying the output of the coarse receiver, one pair of said reversing contacts in the electric circuit for the auxiliary motor being controlled by the modified output of the coarse receiver and operative to energize the auxiliary motor in a direction to add to the movement of the servomotor, the second pair of reversing contacts in the electric circuit for the auxiliary motor being connected in parallel with the first pair and including a movable contact element arranged to be actuated by the auxiliary motor and resiliently mounted cooperative contact elements adapted to yield but biased to central position, a circuit breaker for the second pair of contacts controlled by the first pair, the second pair being connected to energize the auxiliary motor in a direction to subtract from the movement of the servomotor, and means retarding the return of the biased contact elements to central position when moved therefrom.

9. Motion reproducing mechanism comprising a receiver of a transmission system, a driven shaft, a reversible servomotor operatively connected to the driven shaft, a control member for the servomotor, an auxiliary motor, control means for the auxiliary motor, differential means connecting the outputs of the servo and of the auxiliary motor, means including the differential means and the receiver for actuating the control means for the auxiliary motor, and means actuated by the receiver and by the two motors for differentially controlling the control member for the servomotor.

10. Motion reproducing mechanism comprising a receiver of a transmission system, a driven shaft, a reversible servomotor operatively connected to the driven shaft, a control member for the servomotor, an auxiliary motor, means for combining the outputs of the servo and auxiliary motors, differential means actuated by the receiver and by the outputs of the two motors for differentially controlling the control member, energizing means for the auxiliary motor, two pairs of reversible controls for the energizing means, differential means controlled by the combined outputs of the two motors and by the received motion for actuating the first pair of controls, energy storing means associated with the second pair of controls and adapted to effectuate the controls by the energy stored therein, transmission means between the auxiliary motor and the second pair of controls operative to introduce energy into the storing means when the auxiliary motor is energized through the first pair of controls, and disabling means for the second pair of controls controlled by the first pair.

11. Motion reproducing mechanism comprising a receiver of a transmission system, a driven shaft, a reversible servomotor operatively connected to the driven shaft, a control member for the servomotor, an auxiliary motor, means for combining the outputs of the servo and auxiliary motors, differential means actuated by the receiver and by the output of the combining means for differentially controlling the control member, energizing means for the auxiliary motor, two pairs of reversible controls for the energizing means, differential means controlled by the combined outputs of the two motors and by the received motion for actuating the first pair of controls, energy storing means associated with the second pair of controls and adapted to effectuate the controls by the energy stored therein, transmission means between the auxiliary motor and the second pair of controls operative to introduce energy into the storing means when the auxiliary motor is energized through the first pair of controls, disabling means for the second pair of controls controlled by the first pair, and means to control the rate at which the stored energy is expended.

12. Motion reproducing mechanism comprising coarse and fine receivers of a transmission system, a driven member, a reversible servomotor operatively connected to the driven member, a control member for the servomotor, an auxiliary motor, means governed by the coarse receiver for controlling the auxiliary motor, differential means actuated by the fine receiver and by the outputs of the two motors for differentially controlling the control member, a second control member for the servomotor, a cam actuated by the servomotor for governing the second control member, and switching means for selectively effectuating the control members.

13. Motion reproducing mechanism comprising coarse and fine receivers of a transmission system, a driven member, a reversible servomotor operatively connected to the driven member, a control member for the servomotor, an auxiliary motor, means for combining the outputs of the servo and auxiliary motors, differential means actuated by the output of the combining means for modifying the output of the coarse receiver, differential means actuated by the fine receiver and by the outputs of the two motors for differentially controlling the control member, one control device for the auxiliary motor controlled by the modified output of the coarse receiver and operative to energize the auxiliary motor in a direction to add to the movement of the servomotor, a second control device for the auxiliary motor arranged to be actuated by the auxiliary motor when energized by the first device to cause the motor to be energized in a direction to subtract from the movement of the servomotor, disabling means for the second control device controlled by the first device, a second control member for the servomotor, a cam actuated by the servomotor for governing the second control member, and switching means for selectively effectuating the control members.

14. Motion reproducing mechanism comprising coarse and fine receivers of a transmission system, a driven member, a reversible servomotor operatively connected to the driven member, an auxiliary motor, means differentially governed by the fine receiver, the servomotor and the auxiliary motor for controlling the servomotor, means differentially governed by the coarse receiver, the servomotor and the auxiliary motor for controlling the auxiliary motor, and second means for controlling the auxiliary motor, said second means normally biasing the auxiliary motor to a zero position and including means for controlling the rate of return of the auxiliary motor from a displaced position to its zero position as a function of its displacement from its zero position.

15. Motion reproducing mechanism comprising coarse and fine receivers of a transmission system, a driven member, a reversible servomotor operatively connected to the driven member, a control member for the servomotor, an auxiliary motor, means governed by the coarse receiver for controlling the auxiliary motor, means for combining the outputs of the servo and auxiliary motors, and differential means actuated by the fine receiver and by the output of the combining means for differentially controlling the control member.

16. Motion reproducing mechanism comprising coarse and fine receivers of a transmission system, a driven member, a reversible servomotor operatively connected to the driven member, a control member for the servomotor, an auxiliary motor, means for combining the outputs of the servo and auxiliary motors, differential means actuated by the fine receiver and by the output of the combining means for differentially controlling the control member, one control device for the auxiliary motor controlled by the coarse receiver and operative to energize the auxiliary motor in a direction to add to the movement of the servomotor, a second control device for the auxiliary motor arranged to be actuated by the auxiliary motor when energized by the first device to cause the motor to be energized in a direction to subtract from the movement of the servomotor, and disabling means for the second control device controlled by the first device.

17. Motion reproducing mechanism comprising a receiver of a transmission system, a driven shaft, a reversible servomotor operatively connected to the driven shaft, control means for the servomotor, an auxiliary motor, control means for the auxiliary motor, means actuated by the receiver and by the two motors for differentially controlling the control means for the servomotor at a high ratio and means actuated by the receiver and by the two motors for differentially controlling the control means for the auxiliary motor at a low ratio.

18. Motion reproducing mechanism comprising a receiver of a transmission system, a driven member, a reversible servomotor operatively connected to the driven member, an auxiliary motor, means differentially governed by the receiver, the servomotor and the auxiliary motor for controlling the servomotor at a high ratio, means differentially governed by the receiver, the servomotor and the auxiliary motor for controlling the auxiliary motor at a low ratio, and second means for controlling the auxiliary motor, said second means normally biasing the auxiliary motor to a zero position and including means for controlling the rate of return of the auxiliary motor from a displaced position to its zero position as a function of its displacement from its zero position.

19. Motion reproducing mechanism comprising a receiver of a transmission system, a driven member, a reversible servomotor operatively connected to the driven member, an auxiliary motor, means differentially governed by the receiver, the servomotor and the auxiliary motor for controlling the servomotor at a high ratio, means differentially governed by the receiver, the servomotor and the auxiliary motor for controlling the auxiliary motor at a low ratio, second means for controlling the auxiliary motor, said second means normally biasing the auxiliary motor to a zero position and including means for controlling the rate of return of the auxiliary motor from a displaced position to its zero position as a function of its displacement from its zero position and disabling means for the second means for controlling the auxiliary motor controlled by the first mentioned means for controlling the auxiliary motor.

WILLIAM H. NEWELL.

REFERENCES CITED

The following references are of record in the file of this patent:

UNITED STATES PATENTS

| Number | Name | Date |
|---|---|---|
| 1,481,645 | Kaminski | Jan. 22, 1924 |
| 1,684,132 | Hewlett et al. | Sept. 11, 1928 |
| 2,068,490 | Hull | Jan. 19, 1937 |
| 2,160,779 | Granat | May 30, 1939 |